United States Patent
Korssell et al.

(10) Patent No.: US 6,693,406 B2
(45) Date of Patent: Feb. 17, 2004

(54) METHOD OF CONTROLLING A MOTOR AND A POWER SUPPLY APPARATUS

(75) Inventors: Thomas Korssell, Taby (SE); Ulf Jacobson, Uddevalla (SE); Robert Karlsson, Gothenburg (SE)

(73) Assignee: Dometic Applicances AB, Stockholm (SE)

( * ) Notice: Subject to any disclaimer, the term of this patent is extended or adjusted under 35 U.S.C. 154(b) by 0 days.

(21) Appl. No.: 10/179,156

(22) Filed: Jun. 25, 2002

(65) Prior Publication Data

US 2003/0160582 A1 Aug. 28, 2003

(30) Foreign Application Priority Data

Feb. 26, 2002  (SE) .............................................. 0200566

(51) Int. Cl.⁷ ................................................. H02P 7/36
(52) U.S. Cl. ...................... 318/806; 318/766; 318/767; 318/798; 318/807; 318/810; 318/812; 363/19; 363/25; 363/40; 363/131; 62/133
(58) Field of Search ................................. 318/766, 767, 318/798, 807, 810, 812, 806; 363/19, 25, 40, 131; 388/805, 806; 62/133

(56) References Cited

U.S. PATENT DOCUMENTS

| | | | | |
|---|---|---|---|---|
| 3,571,693 A | * | 3/1971 | Riaz | 322/32 |
| 4,099,108 A | * | 7/1978 | Okawa et al. | 318/808 |
| 4,590,413 A | * | 5/1986 | Gritter et al. | 318/803 |
| 4,734,634 A | * | 3/1988 | Kito et al. | 318/778 |
| 4,905,135 A | * | 2/1990 | Unehara et al. | 363/98 |
| 5,027,049 A | * | 6/1991 | Pratt et al. | 318/807 |
| 5,265,435 A | * | 11/1993 | Richardson | 62/133 |
| 5,444,344 A | * | 8/1995 | Vincent | 318/599 |
| 5,627,744 A | * | 5/1997 | Baker et al. | 363/165 |
| 6,121,749 A | * | 9/2000 | Wills et al. | 318/811 |
| 6,456,508 B1 | * | 9/2002 | Namai et al. | 363/17 |

FOREIGN PATENT DOCUMENTS

JP     2001 050630 A    2/2001

* cited by examiner

*Primary Examiner*—Rita Leykin
(74) *Attorney, Agent, or Firm*—Pearne & Gordon LLP

(57) ABSTRACT

The present invention relates to a method and an apparatus for controlling an electric motor by regulating at least the current $I_{out}$, the voltage $U_{out}$ and the frequency $f_{out}$ to an input of said motor, where the number of revolutions of said electric motor is proportional to said frequency $f_{out}$. If an available power $P_{in}$ from an energy source is greater than or equal to the nominal requested power $P_{nom}$ of said electric motor, the current $I_{out}$, voltage $U_{out}$ and frequency $f_{out}$ are set to there corresponding nominal values $I_{nom}$, $U_{nom}$ and $f_{nom}$, respectively, to achieve said requested power $P_{nom}$ and frequency $f_{nom}$. If said available power $P_{in}$ is less than the requester power $P_{nom}$, the voltage $U_{out}$ and the frequency $f_{out}$ are reduced such that the relation between the voltage $U_{out}$ and the frequency $f_{out}$ is essentially constant while said current $I_{out}$ is kept at its nominal value $I_{nom}$.

11 Claims, 3 Drawing Sheets

METHOD OF CONTROLLING A MOTOR AND A POWER SUPPLY APPARATUS

TECHNICAL FIELD

The present invention relates to a method and an apparatus for controlling an auxiliary motor, especially the present invention relates to a method and an apparatus for regulating voltage, current and frequency applied to an auxiliary motor.

BACKGROUND OF THE INVENTION

During transportation of goods that have to be kept cold or frozen, vehicles provided with a cooling system are often utilized. The cargo is kept in a cargo space, which suitably is isolated, and a cooling system is arranged to cool the cargo space down to a given temperature that may be both above and below the freezing point. A cooling system comprises among other things a compressor, a coolant and a hose arrangement to convey the coolant.

In a vehicle with a cooling system as described above, the cooling system must in some way be operated with aid of the vehicle's driving motor when the vehicle is transporting the goods. Then, when the vehicle is stationary and the driving motor is not running this way of operation is no longer available. When the vehicle is stationary the goods may be loaded to a cooling keep. Alternatively, the cargo space in the vehicle may be utilized by connecting the cooling system of the truck and operating it by an electric compressor mounted in the vehicle, which electric compressor for instance is connected to the regular power mains.

When the vehicle is driven the regular power mains may of course not be utilized in operation of the cooling system. Different alternatives then exist according to prior art. The most common way is to arrange a compressor in the engine bay, which is operated through a belt arrangement from the engine. Hose running must then be made from the cooling unit, which commonly is mounted on the roof of the vehicle, to and from the compressor in the vehicle's engine bay. These hose running are of course a source of problem and results in among other things that service of the vehicle is made more expensive since only certified service shops may handle the coolant. Further, the use of two compressors entails extra costs.

The above-described solution according to the prior art suffers from the problem that the effect of the compressor is related to the number of revolutions of the driving motor. When the number of revolutions of the driving motor decreases the power of the compressor also decreases. The compressor and the cooling system must therefore be designed to be able to deliver the cooling necessary at the number of revolutions of the engine that is valid during idle running, or during some average number of revolutions valid during the traffic conditions that the cooling truck will be in, e.g. city traffic. This results in that the cooling system will be designed to have overcapacity. This in turn entails that the compressor, hoses and other material will be expensive.

According to JP 2001050630, Tsuboi Tokushu Shatai K K, "Drive mechanism for refrigerating machine mounted on refrigerator car" current is generated by means of a generator connected to the engine via a battery. The apparatus solves the problem to provide a constant power independent of the number of revolutions of the engine. However, the apparatus working order is limited by the capacity of the batteries and to obtain a greater power supply or power supply during a longer time there is probably necessary with relatively large batteries.

It is thus desirable to discover a way of reducing or completely avoiding the above-mentioned problems.

SUMMERY OF THE INVENTION

In a motor operating a load, preferably a compressor, it may be assumed, somewhat simplified, that the applied voltage and frequency specify the number of revolutions of the motor and the applied current specifies the torque the motor may yield.

The main purpose of the present invention is thus to provide an apparatus and a method for regulating current, voltage and frequency to a load, preferably a motor to provide an effective use of available power.

A specific purpose of the present invention is to provide an apparatus and a method that permit that a smaller cooling system may be utilized to obtain a given cooling capacity of a cooling system in a cooling vehicle.

Above mentioned purposes are provided by an apparatus and a method according to the enclosed independent claims.

Preferred alternatives and embodiments of the present invention are provided by apparatuses and methods according to the enclosed dependent claims.

An advantage of the present invention is that a cooling system in a cooling vehicle only needs one compressor arranged in connection with the cooling space of said cooling vehicle.

An advantage of the present invention is that the proportion of a corresponding cooling installation driven by a compressor arranged to be driven directly by a motor is reducible by a factor of 1.8 to 2.0. I.e. a cooling installation of 2.2 kW is exchangeable for a cooling installation of approximately 1.1 kW during favorable conditions.

Another advantage of present invention is that no hose running for conveying coolant is necessary from a compressor arranged at the engine of a cooling vehicle to a cooling installation arranged in connection with the cooling space in said cooling vehicle.

Another advantage of the present invention is that no battery function is necessary to be arranged in the cooling vehicle for the cooling system.

Another advantage is that a system solution is obtained where two compressors are exchanged for one, which saves weight and which in turn permits that the payload may be increased.

Further features of the invention and advantages thereof will be evident in the following detailed description of embodiments according to the invention.

SHORT DESCRIPTION OF THE DRAWINGS

The present invention will be better understood from the detailed description of preferred embodiments according to the present invention given hereafter and the enclosed drawings 1 to 3, which only are intended to illustrate the preferred embodiments and not to be limiting regarding the present invention.

PREFERRED EMBODIMENTS

In the following description certain specific techniques and appliances are detailed in purpose of giving a thorough understanding of the present invention. However, it is obvious for a person skilled in the art that the present invention may be exercised in other embodiments departing from what in detail is given herein. In other instances detailed descriptions of well-known methods and apparatuses are omitted to not obscure the description of the present invention with unnecessary details.

Figure 1:
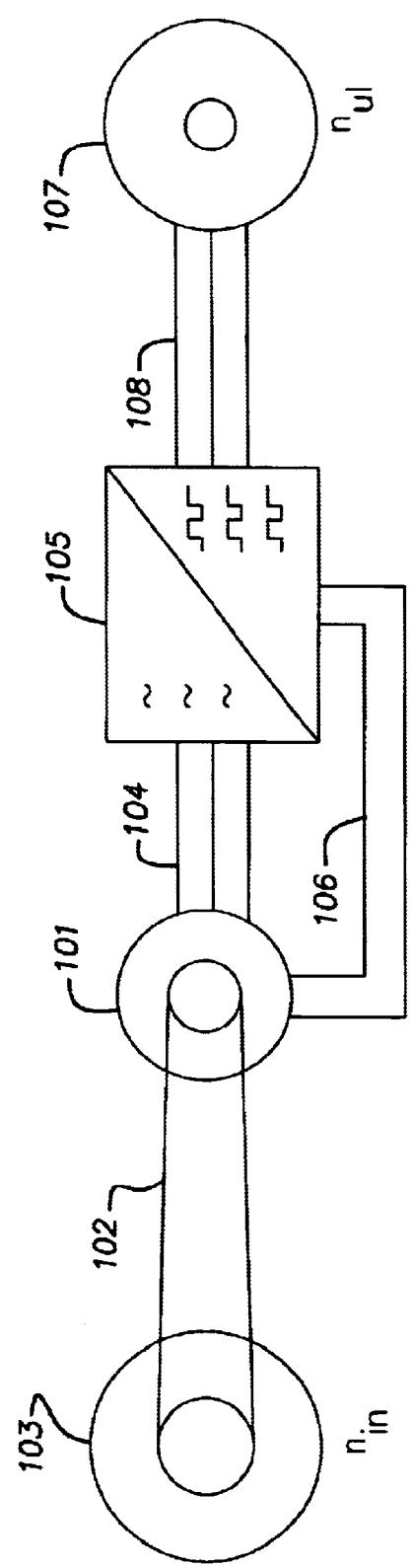
FIG. 1 illustrates a schematic block diagram comprising a regulator according to an embodiment of the present invention.

FIG. 1 shows an outline diagram of a preferred embodiment according to the present invention. A generator 101 is operated via a belt 102 by a driving motor 103 in a conventional way.

The generator 101 generates a tree-phase alternating current that is fed through wires 104 to an electronic unit 105, which will be described in greater detail below. The electronic unit 105 controls a magnetization current, or armature current $I_A$, and a magnetization voltage, or armature voltage $U_A$, which are fed to the generator 101 via wires 106 to control the power output from the generator 101 independent of the number of revolutions $n_{in}$ of the engine 103. The electronic unit 105 also receives a power $P_{in}$ via wires 104, which is defined by a certain current $I_{in}$, voltage $U_{in}$ and frequency $f_{in}$. These quantities will vary in dependence of the number of revolutions $n_{in}$ and the armature current $I_A$ as well as the armature voltage $U_A$. The electronic unit 105 converts $I_{in}$, $U_{in}$ and $f_{in}$ to a current $I_{out}$, a voltage $U_{out}$ and a frequency $f_{out}$, which are fed to a three-phase load 107, in this embodiment a motor 107, through a three-phase wire 108.

The motor 107 is a conventional motor, which is designed to operate optimally for a certain nominal combination of voltage and frequency, e.g. 230 Volt/50 Hertz. It should here be noted that a conventional motor is designed optimally for a specific combination of voltage and frequency, which, for different motors, may vary in dependence of e.g. a country's specific electric supply network. However, the motor will operate optimally if the quotient between the voltage and the frequency is kept constant. I.e. in a system with 230 Volt/50 Hertz the quotient is 4.6. If the voltage is lowered to 200 Volt the motor may be obtained to work in a mainly optimally way if the frequency is lowered to approximately 43.5 Hertz, such that the quotient 4.6 is retained. This will naturally imply that the number of revolutions $n_{out}$ of the motor will be lowered. The engine 107 also has a nominal current $I_{nom}$, which is customary to state at the maximum shaft power output. At this current the motor will exhibit maximum torque.

According to the present embodiment the motor 107 operates a compressor (not shown) in a cooling system for cooling of a cooling space in a cooling vehicle. Other appliances are however within the scope of the present invention, e.g. the motor may operate a pump to oxygenate a water tank with live animals, and other forms of pumps, air compressors, fans or generally everything operated by electricity within a given power output.

Figure 2:
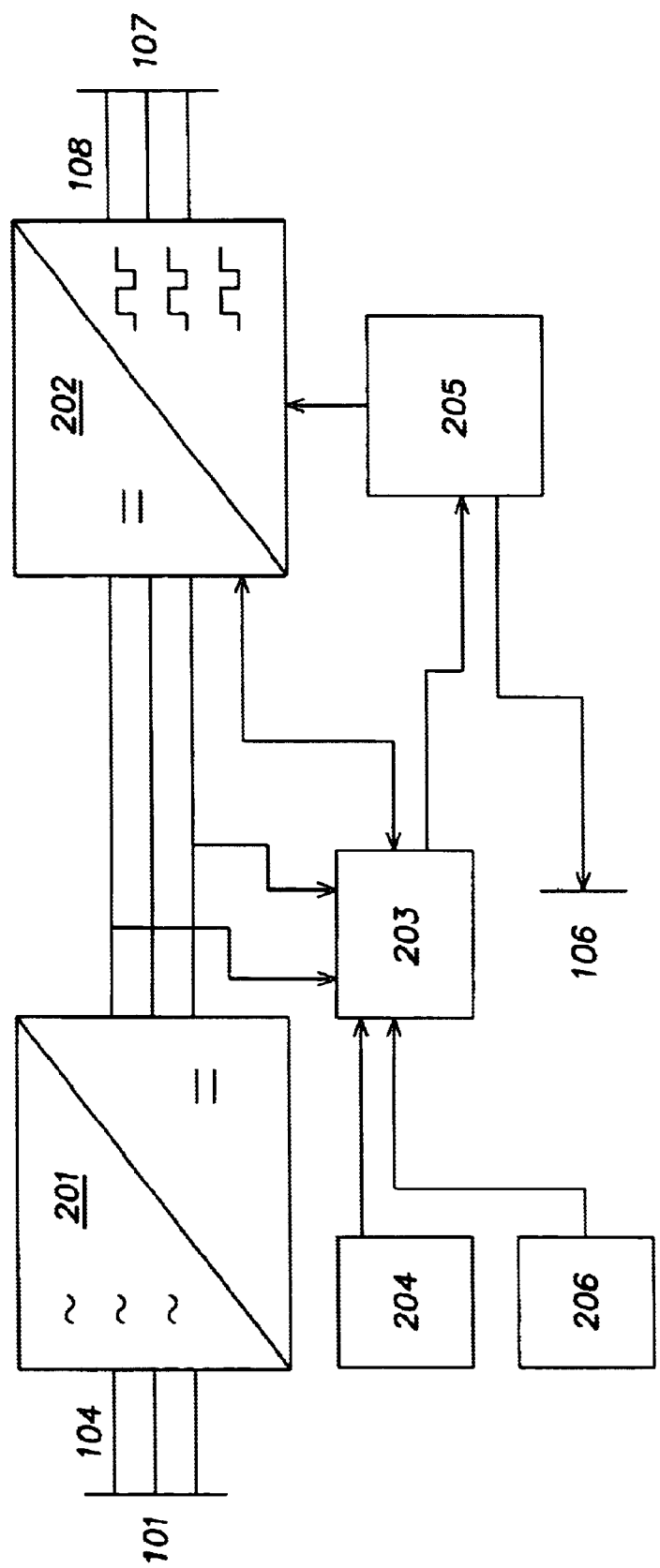
FIG. 2 illustrates the regulator in FIG. 1 in greater detail.

FIG. 2 illustrates the electronic unit 105 in greater detail. A rectifier 201 is fed from the generator 101 and converts the incoming current $I_{in}$ and voltage $U_{in}$ to a direct current, which is fed to an intelligent IGBT power module 202, e.g. a PM50RSD060 of Mitsubishi Electric. A control unit 203 controls the power module 202 to deliver a certain current $I_{out}$, voltage $U_{out}$ and frequency $f_{out}$ via wires 108 to the load 107. The control unit 203 specifies the output parameters in dependence of the input power $P_{in}$ and a ratio controller 204, which specifies the ratio between the voltage and frequency of the motor that is to be kept constant. The control unit 203 also controls the armature current $I_A$ and armature voltage $U_A$ that is supplied to the generator 101 by a supply unit 205. The operation of the arrangement will now be described in greater detail.

A number of conditions of the arrangement is taken in dependence of the number of revolutions $n_{in}$ of the driving motor 103 driving the generator 101 and the power $P_{in}$ that thereby is generated.

If the number of revolutions $n_{in}$ is so big that generator 101 would generate a power $P_{in}$ exceeding the maximal nominal power $P_{nom}$ the motor was designed for in its appliance the control unit 203 lowers, through the supply unit 205, the armature current $I_A$ and/or the armature voltage $U_A$, which is applied to the generator, such that $P_{in}$ is kept essentially equal to $P_{nom}$. Therewith no excess power will be needed to be taken care of by the electronic unit 105. Alternatively the electronic unit 105 may be arranged with further contacts for connection of further equipment, which may be utilized when excess power is available.

If the number of revolutions $n_{in}$ falls below a value at which the generator 101 will deliver a power $P_{in}$ that underpass the required power $P_{nom}$ the armature current $I_A$ will at first hand be raised to its maximum value for which the generator 101 is designed. Thereafter the output power $P_{out}$ must be lowered since naturally the power $P_{out}$ applied to the motor 107 not can exceed the input power $P_{in}$. This is done by lowering the voltage $U_{out}$ and the frequency $f_{out}$ such that the proportion between them is kept equal during that $I_{out}$ is kept constantly equal to $I_{nom}$. Therewith the motor will operate within its optimal working range, however at a lower number of revolutions $n_{out}$. The lower number of revolutions $n_{out}$ results in that the own cooling of the engine is reduced when the motor fan rotates slower, however the engine's power is also less and therewith the cooling need is also reduced to a corresponding degree.

In this way an effective utilization of the available power is obtained for operating a motor.

To obtain constant magnetization of the motor during full torque $f_{out}$ and $U_{out}$ is ramped with a constant quotient when the motor 107 is started. This entails that high starting currents are avoided, which otherwise are usual during a direct start of squirrel-cage induction motors. The ramping function entails that the start of heavy loads (engine loads) is possible which otherwise could entail starting problems during a direct start.

According to a preferred embodiment a lower frequency limit is stated below which a motor must not be operated. This involves that the voltage and frequency only can be lowered to a certain specific breakpoint, which is stated with $f_{min}$ and $U_{min}$. If the number of revolutions $n_{in}$ falls such as the voltage should be reduced below $U_{min}$, which not is allowed, the output voltage $U_{out}$ and output voltage $f_{out}$ is kept equal to $U_{min}$ and $f_{min}$ during that $I_{out}$ instead is reduced. Therewith the torque of the motor will be reduced.

Figure 3:
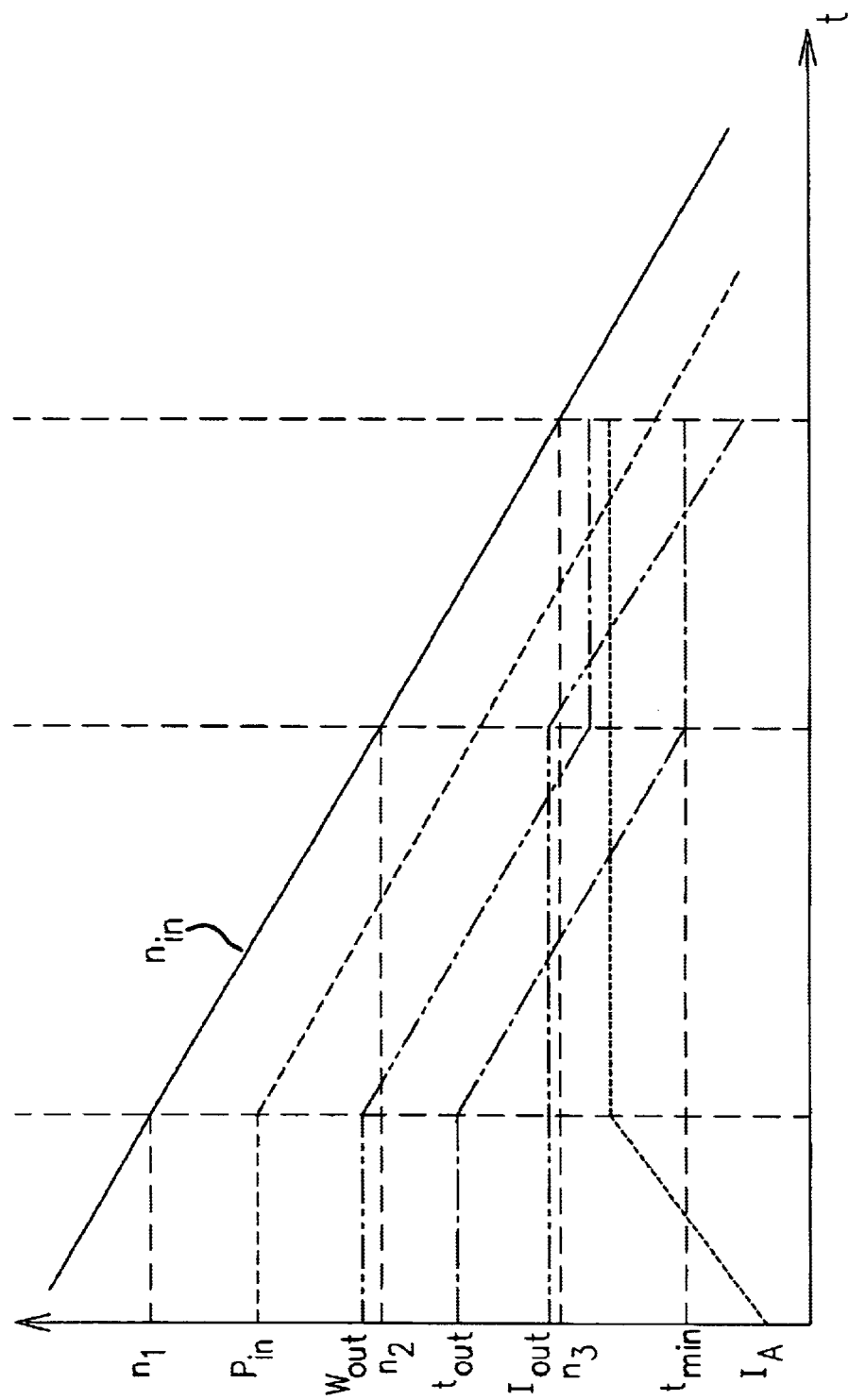
FIG. 3 illustrates how the input power, output voltage, output current, output frequency and armature current varies with the number of revolutions of an internal combustion engine.

In FIG. 3 an ease off process for a motor and how a number of revolutions $n_{in}$, input power $P_{in}$, output power $U_{out}$, output current $I_{out}$, output frequency $f_{out}$ and armature current $I_A$ varies during the process is illustrated. In facilitating purposes a linear ease off is illustrated where $n_{in}$ varies linearly between a maximum value and a minimum value. However, it is obvious that a motor not necessarily exhibits such a linear ease off curve dependent on the characteristic that its load exhibits, which however in no way changes the following principles of how the present invention operates.

In the beginning of the process the number of revolutions $n_{in}$ is high and the armature current $I_A$ is therewith low in purpose of only generating the power necessary to drive the motor. The control unit therewith set $U_{out}$, $I_{out}$ and $f_{out}$ at their respective nominal values and increases the armature current as the number of revolutions $n_{in}$ falls, to maintain the same input power $P_{in}$, which can be seen in FIG. 3.

When the number of revolutions $n_{in}$ has fallen to $n_1$ the armature current $I_A$ has reached its maximum value and cannot be increased anymore. Therewith the input power $P_{in}$ will from this point on be reduced with the number of revolutions, which is illustrated in FIG. 3. Therewith the control unit 203 reduces $U_{out}$ and $f_{out}$ with maintained ratio, to adapt the output power $P_{out}$ to the available input power $P_{in}$ during that $I_{out}$ is kept constant. The power $P_{in}$ (n) need of course not be linear since $P_{in}$ is controlled by $P_{out}$, i.e. what the characteristics of the motor load are. A linear connection is illustrated in the present embodiment for purpose of facilitating the understanding.

When $f_{out}$ has reached $f_{min}$ the frequency may not be reduced any more wherewith the control unit 203 instead of reducing the voltage $U_{out}$ reduces the current $I_{out}$ when the voltage goes below $n_2$.

When the number of revolutions goes below $n_3$ the input power $P_{in}$ is too small to drive the motor at all, and therefore the motor is shut off. It is thus realized that $n_3$ is the lowest number of revolutions an internal combustion engine 103 may have to drive the motor 107 and therewith the compressor and the cooling unit. The cooling capacity necessary for a given application and at which the number of revolutions $n_{in}$ are the idle number of revolutions, or alternatively are an average number of revolutions for driving a cooling vehicle in a given traffic environment, will off course be decisive for the design of the generator and the cooling system.

It has been manifested, by theoretic calculation and practical tests, that it is possible to reduce the power of the cooling installations with a factor of 1.8 to 2.0 by utilization of an apparatus and a method according to the present invention instead of a conventional cooling installation where the compressor is situated in connection with the internal combustion engine and driven by e.g. a belt.

It is obvious that the present invention may be varied in many different ways. Such variations shall not be regarded as a departure from the scope of the present invention. All such modifications that is obvious for a person skilled the art are intended to be included within the scope of the enclosed claims.

What is claimed is:

1. A method of controlling an electric motor by regulating at least a current $I_{out}$, a voltage $U_{out}$ and a frequency $f_{out}$ to an input of said motor, where the number of revolutions for said electric motor is proportional to said frequency $f_{out}$, comprising the steps of:

if an available power $P_{in}$ from an energy source provided in purpose of driving said electric motor is larger than or equal to the nominal desired power $P_{nom}$ for said electric motor, the current $I_{out}$, the voltage $U_{out}$ and the frequency $f_{out}$ are set to corresponding nominal values $I_{nom}$, $U_{nom}$ and $f_{nom}$ respectively, to obtain said desired power $P_{nom}$ and desired frequency $f_{nom}$;

if said available power $P_{in}$ is less than said desired power $P_{nom}$, $U_{out}$ and $f_{out}$ are reduced, such that the ratio between $U_{out}$ and $f_{out}$ is substantially constant during that $I_{out}$ is kept equal to $I_{nom}$.

2. The method according to claim 1, wherein said energy source is a generator connected to an internal combustion engine with varying number of revolutions, wherein said generator emits a voltage $U_{in}$, a current $I_{in}$, and therewith associated power $P_{in}$, and a frequency $f_{in}$ varying with the number of revolutions of said motor as well as where a magnetizing current $I_A$ is applied to the generator to obtain magnetization, comprising the further step of:

said magnetizing current is adapted to keep the emitted power $P_{in}$ from the generator substantially equal to the desired nominal power $P_{nom}$.

3. The method according to claim 2, wherein said internal combustion engine is a motor in a vehicle such as a truck.

4. A power supply apparatus arranged to provide a current $I_{out}$, a voltage $U_{out}$ and a frequency $f_{out}$ on at least a first output where said first output at first hand is arranged to keep a first nominal voltage $U_{nom}$, a first nominal current $I_{nom}$, a first nominal power $P_{nom}$ and a first nominal frequency $f_{nom}$ in purpose of driving an electric motor, said power supply apparatus comprising an input arranged to be connected to an energy source arranged to emit a power $P_{in}$ which may vary, wherein:

said power supply apparatus is arranged to regulate $P_{in}$ to the necessary output $P_{out}$;

said power supply apparatus is arranged to keep the ratio between the voltage $U_{out}$ and the frequency $f_{out}$ mainly constant; and said power supply apparatus is arranged to reduce the voltage $U_{out}$ in case of that the power $P_{in}$ is less than $P_{nom}$, while the current $I_{out}$ is kept essentially constant.

5. The power supply apparatus according to claim 4, comprising a control unit to at least partly control the emitted power $P_{in}$ from said energy source; and said power supply apparatus is arranged to control said energy source to keep the emitted power $P_{in}$ from said energy source essentially equal to the desired nominal power $P_{nom}$.

6. The power supply apparatus according to claim 4, wherein said energy source is a generator and said control unit is the magnetizing current to said generator.

7. The power supply apparatus according to claim 4, wherein said power supply apparatus is arranged to increase the magnetizing current $I_A$ to a maximum magnetizing current $I_{Amax}$ and to thereafter reduce $U_{out}$ during that $I_{out}$ is kept constant if $P_{in}$ is less than $P_{nom}$.

8. The power supply apparatus according to claim 4, further comprising at least a second output arranged to provide a power $P_2$ over a load L.

9. The power supply apparatus according to claim 8, wherein said power supply apparatus is arranged to control said energy source to maintain the emitted power $P_{in}$ from the energy source essentially equal to the sum of the desired nominal power $P_{nom}$ and the power $P_2$.

10. The power supply apparatus according to claim 8, wherein said power supply apparatus is arranged to increase the magnetizing current $I_A$ to a maximum magnetizing current $I_{Amax}$ to maintain the emitted power $P_{in}$ equal to the sum of $P_{nom}$ and $P_2$.

11. The power supply apparatus according to claim 8, wherein said power supply apparatus is arranged to shut off said second output if the sum of $P_{nom}$ and $P_2$ is greater than $P_{in}$.

* * * * *

UNITED STATES PATENT AND TRADEMARK OFFICE
CERTIFICATE OF CORRECTION

PATENT NO. : 6,693,406 B2  
DATED : February 17, 2004  
INVENTOR(S) : Thomas Korssell et al.

It is certified that error appears in the above-identified patent and that said Letters Patent is hereby corrected as shown below:

<u>Title page,</u>  
Item [57], Inventors, please delete "Gothenburg (SE)", and insert therefor
-- Goteborg (SE) --.  
Item [73], Assignee, please delete "Applicances", and insert therefor -- Appliances --.

Signed and Sealed this

Twentieth Day of July, 2004

JON W. DUDAS  
*Acting Director of the United States Patent and Trademark Office*